United States Patent
Hildebrand (10) Patent No.: US 8,788,654 B2
(45) Date of Patent: Jul. 22, 2014

(54) SYSTEM AND METHOD FOR ALLOCATING RESOURCES BASED ON EVENTS IN A NETWORK ENVIRONMENT

(75) Inventor: Joseph J. Hildebrand, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 544 days.

(21) Appl. No.: 12/962,457

(22) Filed: Dec. 7, 2010

(65) Prior Publication Data

US 2012/0144038 A1    Jun. 7, 2012

(51) Int. Cl.
G06F 15/173 (2006.01)
H04L 12/56 (2006.01)

(52) U.S. Cl.
CPC .................... H04L 47/823 (2013.01)
USPC ............ 709/224; 709/225; 709/226; 709/229

(58) Field of Classification Search
USPC .................................................. 709/206, 226
See application file for complete search history.

(56) References Cited

U.S. PATENT DOCUMENTS

| | | | |
|---|---|---|---|
| 2002/0161868 A1* | 10/2002 | Paul et al. ...................... | 709/221 |
| 2003/0110085 A1* | 6/2003 | Murren et al. .................. | 705/26 |
| 2005/0015624 A1* | 1/2005 | Ginter et al. ................... | 713/201 |
| 2005/0081210 A1* | 4/2005 | Day et al. ....................... | 718/104 |
| 2006/0120282 A1 | 6/2006 | Carlson et al. | |
| 2006/0242647 A1* | 10/2006 | Kimbrel et al. ................ | 718/104 |
| 2007/0206220 A1* | 9/2007 | Berg et al. ..................... | 358/1.15 |
| 2008/0307259 A1* | 12/2008 | Vasudevan et al. ............. | 714/23 |
| 2009/0113056 A1* | 4/2009 | Tameshige et al. ............ | 709/226 |
| 2009/0198719 A1* | 8/2009 | DeWitt .......................... | 707/102 |

OTHER PUBLICATIONS

Felber, et al., "Proactive Hot Spot Avoidance for Web Server Dependability," Proceedings of the 23rd IEEE International Symposium on Reliable Distributed Systems, Oct. 2004.
Extended European Search Report in European Application No. 11177577.1, dated Mar. 18, 2012.
Wikipedia, "PID Controller," [retrieved and printed on Dec. 7, 2010], 15 pages; http://en.wikipedia.org/wiki/PID_controller.
Wikipedia, "Ping," [retrieved and printed on Dec. 7, 2010], 4 pages; http://en.wikipedia.org/wiki/Ping.

* cited by examiner

Primary Examiner — Jeffrey M Rutkowski
Assistant Examiner — Hardikkumar Patel (57) ABSTRACT

An example method is provided and includes receiving information associated with a network event; predicting network activity associated with the network event; determining a level of network resources that can accommodate the network activity associated with the network event; evaluating currently deployed network resources; and allocating new network resources based on the network activity that was predicted. In more particular embodiments, the new network resources can include a cache configured to receive replicated content from a server. Additionally, the new network resources can include a virtual machine configured to interact with a server to distribute a load associated with the network event. The new network resources can be allocated before the network activity occurs. In other examples, the information associated with the network event is received based on a registration activity executed by a server configured to designate particular events for which it is interested.

20 Claims, 6 Drawing Sheets

SYSTEM AND METHOD FOR ALLOCATING RESOURCES BASED ON EVENTS IN A NETWORK ENVIRONMENT

TECHNICAL FIELD

This disclosure relates in general to the field of communications and, more particularly, to allocating resources based on events in a network environment.

BACKGROUND

In computer networking, network administrators are tasked with managing, prioritizing, controlling, and optimizing the flow of network traffic. This can include coordinating Internet bandwidth, allocating resources, and minimizing congestion, latency, and packet loss. Accordingly, resource allocation and traffic shaping have become increasingly prominent in the field of network management. In some scenarios, virtualized deployment models can operate to consolidate virtual machines, where unused hardware is ramped down to save power. Allocating new resources is straightforward; however, optimal resource allocation should be executed prior to surging loads, which can overwhelm an architecture. The ability to properly manage resources and, further, to efficiently address content requests presents a significant challenge to system designers, component manufacturers, service providers, and network administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving information associated with a network event; predicting network activity associated with the network event; determining a level of network resources that can accommodate the network activity associated with the network event; evaluating currently deployed network resources; and allocating new network resources based on the network activity that was predicted.

In more particular embodiments, the new network resources can include a cache configured to receive replicated content from a server. Additionally, the new network resources can include a virtual machine configured to interact with a server to distribute a load associated with the network event. The new network resources can be allocated before the network activity occurs.

In other examples, the information associated with the network event is received based on a registration activity executed by a server configured to designate particular events for which it is interested. The information associated with the network event can be identified through a search engine element configured to monitor network traffic associated with certain types of events. An application program interface (API) can be used to interface with a source associated with the network event. The API can be associated with any type of protocol (e.g., e-mail traffic, hypertext transfer protocol (HTTP) traffic, Simple Network Management Protocol (SNMP) traffic, etc.).

Example Embodiments

Figure 1:
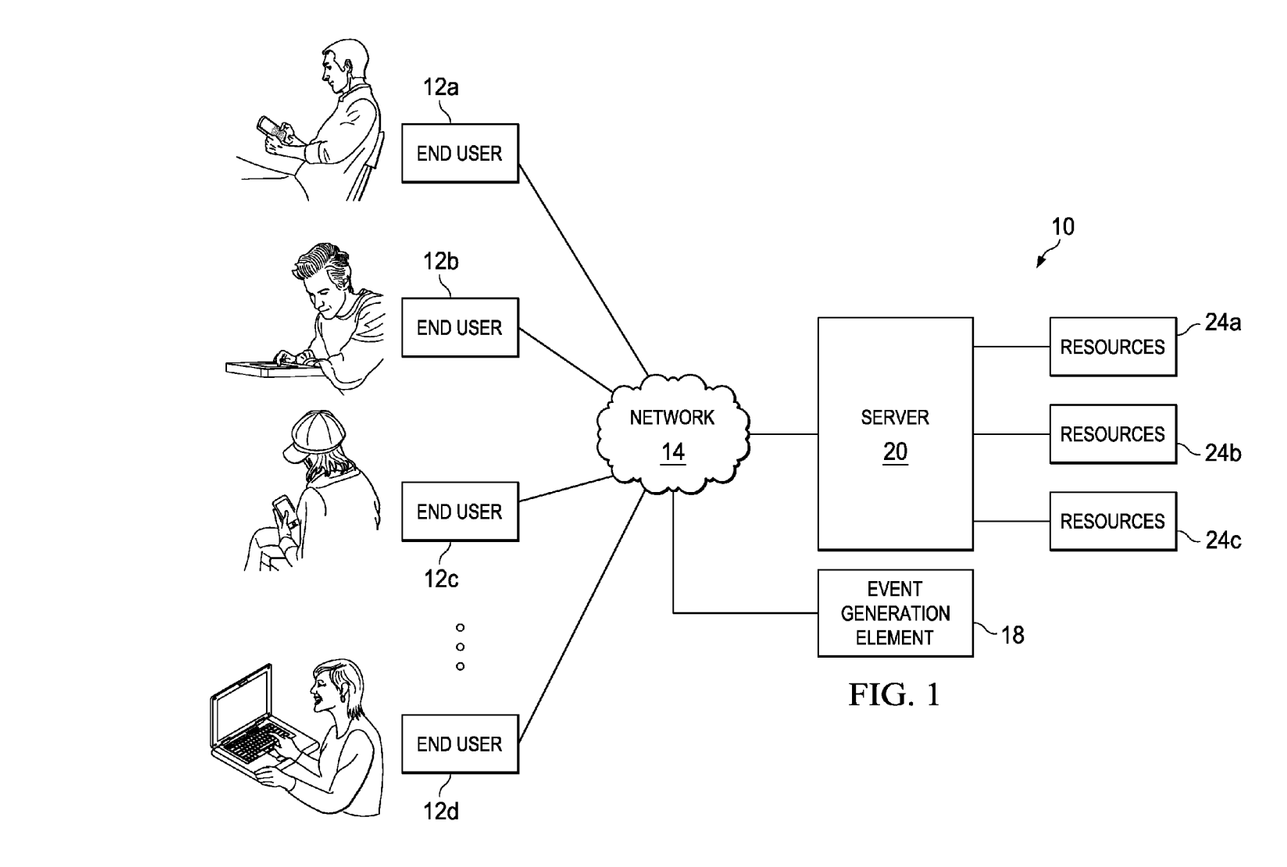
FIG. 1 is a simplified block diagram of a system for allocating resources based on a predicted load in a network environment in accordance with one embodiment of the present disclosure.

Turning to FIG. 1, FIG. 1 is a simplified block diagram illustrating a system 10 for proactively allocating resources based on network events in accordance with one embodiment of the present disclosure. System 10 may include a network 14, an event generation element 18, and a server 20, which is suitably coupled to (or that inherently includes) multiple resources 24a-c. As is illustrated, FIG. 1 also includes several end users 12a-d, who are operating different types of devices (e.g., a computer, a personal digital assistant (PDA), a tablet, a smartphone, etc.). These devices are capable of achieving connectivity to any given network in order to perform various internet activities such as initiating search queries, reviewing web content, conducting media sessions, streaming video content, etc.

System 10 may include a configuration capable of transmission control protocol/internet protocol (TCP/IP) communications for the transmission and/or reception of packets in a network. System 10 may also operate in conjunction with a user datagram protocol/IP (UDP/IP) or any other suitable protocol where appropriate and based on particular needs. System 10 may be generally configured or arranged to represent a 2G, a 2.5G, a 3G, a 3.5G, or a 4G communication architecture applicable to a Global System for Mobile (GSM) environment in accordance with a particular embodiment of the present disclosure. System 10 may also be configured to operate with any version of any suitable GPRS tunneling protocol. System 10 is equally applicable to platforms associated with long-term evolution (LTE).

In accordance with the teachings of the present disclosure, system 10 includes a comprehensive framework to intelligently predict load surges of end user traffic based on the occurrence of certain events. System 10 can proactively provision resources 24a-c before a load becomes insupportable by network equipment. Additionally, the architecture can consistently spool resources to accommodate an anticipated demand. In essence, system 10 offers a predictive mechanism that enables adding capacity to systems before load spikes disrupt the normal flow of communications. Moreover, the architecture of system 10 can employ various tools for refining the predictive model (e.g., monitoring real-time searches, Bayesian calculations of search terms, etc.). Note that these tools are discussed in detail below. Before turning to some of those operational features, it is important to understand some of the problems created by dramatic increases in network traffic.

In network scenarios, a sudden burst of publicity may inadvertently cause a web traffic overload at a given node. For example, a news item in the media, a quickly propagating email, or a link from a popular site may cause an inordinate number of visitors to a particular web server. This is often referred to as the Slashdot effect (also known as slash dotting), which can wreak havoc in the network.

Frequently, the Slashdot effect occurs when a popular website provides links to a smaller site: causing a massive increase in traffic for the smaller site. This condition overloads the smaller site: causing it to slow down, to temporarily close, to become unresponsive, or to even crash. The Slashdot name stems from the huge influx of web traffic resulting from the technology news site Slashdot, which includes content that typically links to other websites. The effect has been associated with other websites or metablogs such as Fark, Drudge Report, Reddit, Twitter, and Digg. The Slashdot effect looks similar to a denial-of-service (DoS) attack. This is because, once the content spikes in popularity, the website offering that content becomes flooded with more requests than it could possibly handle.

Often, less robust websites are vulnerable to these network conditions, where huge increases can stymie the normal operation of corresponding web servers. The most common causes for this dysfunction include: servers that fail to cope with the high number of requests, traffic links that become congested to the point of packet loss and failure, and bandwidth shortages that become problematic. Logistically, websites that are maintained on shared hosting services often fail when confronted with the Slashdot effect.

Major news sites (or corporate websites) are routinely provisioned to serve large numbers of requests and, therefore, do not normally exhibit this effect. Although, it should be noted that these sites are still burdened, and still experience slow response times when there is a dramatic surge in network traffic. Vulnerable websites can also include those that attempt to offer large (e.g., high-definition) images, movie files, or that simply have inefficiencies associated with generating and distributing dynamic content (e.g., multiple database hits for every web hit even when each of the web hits are requesting the same page). In many circumstances, these websites quickly become unavailable within a few minutes of a story's appearance. Occasionally, paying Slashdot subscribers (who would have access to content before non-paying users are offered the same privilege) have rendered a site unavailable even before the story is posted for the general readership. In essence, too much web traffic dramatically inhibits, slows, or even prevents access to a website.

One response to the Slashdot effect is to systematically overprovision resources. However, this strategy is both wasteful and inefficient. Additionally, this flawed strategy indirectly occupies important resources that could be diverted to important network activities. From the perspective of a network administrator, and in the context of unexpected spikes in traffic loads (e.g., such as a website being mentioned on a popular content platform), the extra load would need to be noticed, where suitable capacity should be added immediately. Provisioning that capacity quickly enough, in the face of what might otherwise look like a distributed denial-of-service attack, can be quite difficult.

If an appropriate notification were delivered (even seconds before the network traffic increased dramatically), then resources can be intelligently deployed to allay many of the problems associated with traffic overload. This is particularly applicable in a hosting environment, where resources are commonly available to a network administrator to use for this very purpose. Often times, the resources are simply not powered on, operating in a standby mode, or are passively being allocated elsewhere. The administrator can effectively use these resources in an intelligent manner in response to an anticipated increase in network traffic. However, the timing in the deployment of resources is critical; existing architectures fail miserably to properly allocate resources before surges in network activity occur.

System can 10 overcome the aforementioned deficiencies (and others) in providing an intelligent system for proactively allocating resources in a network. An administrator (or the architecture itself) can quickly ramp up resources 24a-c to accommodate a predicted demand (i.e., a predictive level of network activity). Assuming a number of initial checks are successfully executed, the ability to deploy additional resources can be in the order of seconds (or minutes). Note that as used herein in this Specification, the term 'resources' is meant to include computing hardware and software (e.g., servers, routers, load balancers, firewalls, processors, etc.), memory and caching resources (e.g., disk space, databases, buffers, queues, etc.), network equipment (e.g., associated with links, bandwidth, interfaces, etc.), or any other network infrastructure that may be provisioned in response to predicting a certain level of network activity.

In operation, the allocation of additional resources can be both quantitative and qualitative. For example, there may be a need to deploy certain types of resources to accommodate a specific type of demand (e.g., deploying video servers based on the expectation of streaming content, deploying caches based on the expectation of repeated queries being issued, deploying a more robust load balancer or firewall based on the expectation of a higher number of end user requests, etc.). In this sense, different network services are being deployed in response to a specific predicted load. The important point to note is that without the predictive mechanisms of the present architecture, successfully coordinating a sudden dramatic increase in network traffic would be virtually impossible. Once the load surge hits a given server, deploying additional resources becomes futile. In this sense, once the wave of network traffic is present, it is simply too late to accommodate the rapid increase in end user requests.

Even a few seconds of warning of an impending load can result in a significant difference in providing an adequate response mechanism. If provided fair warning, new virtual environments can be dynamically ramped-up before the network spike arrives. Several approaches can be used to predict these load spikes. For example, a real-time search engine (e.g., Collecta) that is indexing the most important sources of traffic can be set to search for uniform resource locators (URLs) that match a target service, along with keywords that would drive traffic toward the target service. For example, if there was a story on a popular blog about the animated movie "UP" or that mentioned "pixar.com," the Disney-Pixar web servers could have capacity added to them proactively. Each source would drive a different amount of traffic, which can be predicted using any number of viable predictive protocols. Some sources can theoretically drive a different amount of traffic, which may be based on the section of a source (e.g., a section in Twitter) that is generating the traffic. For these sources, a designated application program interface (API), or web service calls can be used to estimate the generated load. After the load is estimated, capacity can be proactively added to the system quickly and automatically, before the full brunt of the load operates to flood the service.

As a refinement to these activities, data from a referrer logs and the text or markup of the referring pages to the service can be fed into a Bayesian filter. Additionally, the Bayesian filter can be fed the text or markup of popular sites that tend to influence traffic patterns. This filter could correlate the received load on the service with the text or the markup, which would suggest new keywords or URLs to add to the real-time search criteria. In this sense, the body of knowledge can continue to grow and expand in offering better predictions for network response patterns.

Note that in certain detailed embodiments of the present disclosure, a Proportional/Integral/Derivative (PID) control loop could be used to more accurately predict load from a multitude of weighted inputs. The inputs or the weights may change over time. In general terms, the PID can be provisioned at any appropriate location (e.g., software/algorithm within server 20), where its functionality can be associated with the predicting activities discussed herein. The PID control loop can be configured to calculate an error value as the difference between a measured process variable and a desired setpoint. The PID algorithm can be configured to minimize the error by adjusting the process control inputs.

An alternative approach of the present disclosure would allow cooperating sources of traffic to warn the service of the impending load (e.g., before the keyword or link of interest is made available to the general public). The service could declare the keywords and links it wanted to be warned of from the cooperating sources. The cooperating source can notify the service of the impending load, along with an estimate of the load that would most likely be generated. The service can then notify (i.e., send an alert to) the cooperating source when adequate resources were brought online to satisfy this surge in load. If adequate resources are unavailable, the cooperating source can be given enough information so that it can throttle the speed at which it would make the information available to the public. In terms of enhancing the intelligence of system 10 (e.g., in a postmortem analysis) an actual load spike can be fed back into the architecture, and used to refine the prediction mechanisms (e.g., an algorithm within server 20). This can ensure that capacity is added as precisely as possible: understanding that too much capacity wastes power, and that too little capacity hampers the end user experience.

Logistically, the architecture of system 10 is not bluntly reactive, but rather intelligent enough to be predictive. For example, a blunt reactive mechanism may involve a backup server coming online based on its parent server becoming overwhelmed. In most scenarios, that child server only understands a certain load capacity threshold, where loads that exceed the threshold would trigger the child server springing into action. This stands in contrast to the enhanced predictive nature of system 10, which can be configured to proactively assign appropriate resources in anticipation of the incoming load.

It should also be noted that the cost to deploy the predictive mechanism is minimal. This is because the network resources to be allocated are already in existence: ready to be deployed to address increases in network traffic. Conversely, if the predicted network traffic did not appear for some reason, the newly-allocated resources can be dynamically ramped down in order to conserve power. In terms of a cost benefit analysis, the cost associated with failing to account for the increased load is significant, whereas the cost associated with allocating additional resources that ultimately do not get used is minimal. Stated differently, failing to accommodate a surge in traffic load can be disastrous in network communications; however, a minor mistake in deploying resources that were ultimately not used (where the surge failed to metastasize in the network) is perfectly acceptable in such traffic management scenarios.

Figure 2:
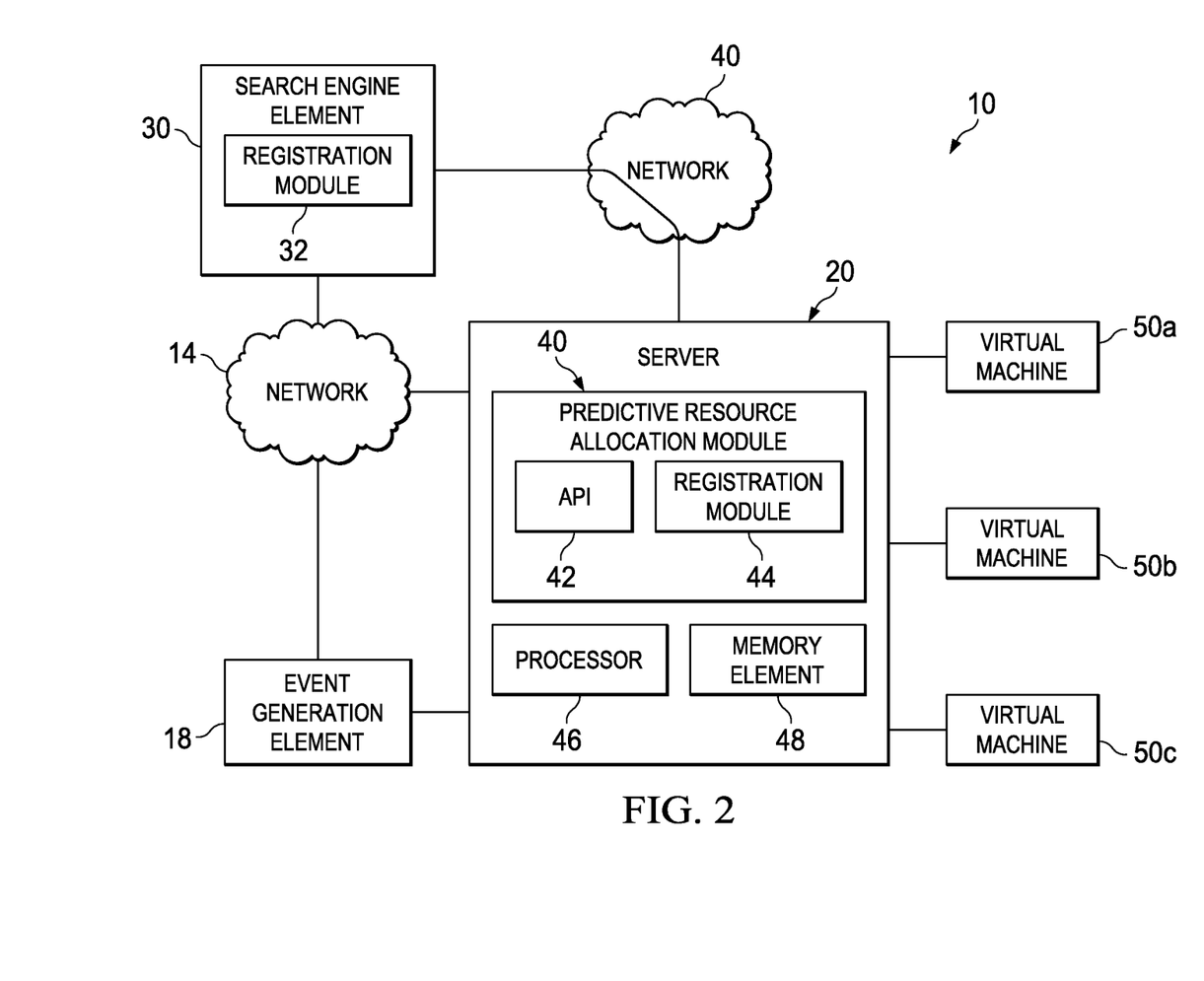
FIG. 2 is a simplified block diagram illustrating one example configuration associated with the system.

Turning to FIG. 2, FIG. 2 is a simplified block diagram illustrating one possible arrangement associated with the present disclosure. FIG. 2 includes a network 40, and a search engine element 30, which includes a registration module 32. In this particular implementation, server 20 includes a predictive resource allocation module 40, which includes an application program interface (API) 42, and a registration module 44 that can interact with registration module 32. Server 20 may also include a processor 46 and a memory element 48. Additionally, a number of virtual machines 50*a-c* may be suitably coupled to server 20, or provisioned therein in certain configurations of system 10.

As a general proposition, FIG. 2 is reflective of the predictive mechanisms of system 10 being integrated with search engine protocols. In one particular example, keywords can be monitored in order predict resources that may be needed to satisfy particular of end user requests (e.g., at particular servers, caches, etc.). For example, consider an instance in which a report surfaced that a famous painter has died. Galleries that sell or exhibit the painter's work are most likely going to experience an increase in network traffic. In this particular example involving the painter, system 10 is configured to quickly deploy resources at the gallery's website in order to avoid overwhelming (or even crashing) that website. This can include provisioning caches, additional web servers, loadbalancers, virtual machines, or any other appropriate piece of hardware or software that could alleviate the surge in load. Hence, the predictive mechanisms of the present disclosure can be dynamically integrated into search engine protocols.

In operation of one example, system 10 can receive information associated with a network event (where the 'information' can include any type of data, alert, relay, notification, etc. associated with the network event). The actual 'network event' could be associated with a publication, a press release, a video broadcast, an e-mail, a data segment, or any other network event: many examples of which are discussed herein in this Specification. System 10 can then predict network activity associated with the network event. In this context, 'predict' includes evaluating, determining, or otherwise processing information in order to make an intelligent assessment of network activity. The 'network activity' can be associated with end user requests, bandwidth usage, video streaming, hits on a website, or any other activity that may implicate network infrastructure (inclusive of software, servers, websites, links, hardware, etc.). System 10 can then determine a level of network resources that can accommodate the network activity associated with the network event. The determination can be made by an algorithm, a network administrator, a piece of hardware or software, etc. Subsequently, system 10 can evaluate currently deployed network resources, which may include recognizing that there are minimal resources (or even no adequate resources) currently being deployed. After such an evaluation has been completed, system 10 can then allocate new network resources based on the network activity that was predicted. Note that this terminology of 'predicting', 'determining', and 'evaluating' is broad and, therefore, encompasses any number of actions associated with analyzing a proper course of action based on some event (or anticipated event) in the network. Before turning to details associated with various additional operations associated with this architecture, a brief discussion is provided about the infrastructure of FIGS. 1-2.

End users 12*a-d* can be associated with clients, customers, or end users wishing to initiate a communication in system 10 via some network. In one particular example, end users 12*a-d* are simply individuals capable of generating network traffic. The term 'end user' is inclusive of devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, or object capable of initiating voice, audio, video, media, or data exchanges within system 10. End users 12*a-d* may also be inclusive of a suitable interface to the human user, such as a microphone, a display, or a keyboard or other terminal equipment. End users 12a-d may also be any device that seeks to initiate a communication on behalf of another entity or element, such as a program, a database, or any other component, device, element, or object capable of initiating an exchange within system 10. Data, as used herein in this document, refers to any type of numeric, voice, video, media, or script data, or any type of source or object code, or any other suitable information in any appropriate format that may be communicated from one point to another.

Networks 14 and 40 represent a series of points or nodes of interconnected communication paths for receiving and transmitting packets of information that propagate through system 10. Networks 14 and 40 offer a communicative interface between end users 12a-d and other network elements, and may be any local area network (LAN), Intranet, extranet, wireless local area network (WLAN), metropolitan area network (MAN), wide area network (WAN), virtual private network (VPN), or any other appropriate architecture or system that facilitates communications in a network environment. Networks 14 and 40 may implement a UDP/IP connection and use a TCP/IP communication protocol in particular embodiments of the present disclosure. However, networks 14 and 40 may alternatively implement any other suitable communication protocol for transmitting and receiving data packets within system 10. Networks 14 and 40 may foster any communications involving services, content, video, voice, or data more generally, as it is exchanged between end users 12a-d and various network elements.

Server 20 is a network element configured to exchange network data with any appropriate entity. In one particular implementation, server 20 is configured to provide some type of content to any interested entity. Server 20 can be part of some type of search engine, or such a search engine can be provided separately, as is illustrated in FIG. 2. Server 20 can be configured to offer response content or services to any end user, or to any group of end users. Additionally, server 20 can be any destination, location, or node that is sought to be accessed or used by end users 12a-d. Server 20 may provide the requested data/service/content, or provide a portal, pathway, or gateway to another location that includes the desired data. In other embodiments, server 20 could simply be a processing element or a data storage location that can store or deliver content or services to one or more end users 12a-d.

In one particular instance, server 20 is a network element configured to exchange data in a network environment. As used herein in this Specification, the term 'network element' is meant to encompass various types of routers, switches, gateways, bridges, loadbalancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with allocating resources based on predicted loads, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, server 20 includes software to achieve (or to foster) the resource allocation operations, as outlined herein in this document. For example, this could include predictive resource allocation module 40, which can be configured to execute many of the activities discussed herein with respect to resource allocation. Furthermore, in one example, server 20 can have an internal structure (e.g., have a processor, a memory element, etc.) to facilitate some of the operations described herein. In other embodiments, all of these resource allocation features may be provided externally to this element or included in some other network element to achieve this intended functionality. Alternatively, server 20 includes this software (or reciprocating software) that can coordinate with other elements in order to achieve the operations, as outlined herein. In still other embodiments, a given network element (e.g., search engine element 30) may include any suitable algorithms, hardware, software, components, modules, interfaces, or objects that facilitate the operations described herein.

Event generation element 18 is a network element configured to exchange data in a network environment. In more particular implementations, event generation element 18 can be associated with any appropriate data feed, repository, content provider, website, publication mechanism (e.g., for academic publications, for professional journals (e.g., finance journals, medical journals, technology journals more generally, etc.)), news link, search engine (e.g., Collecta), or any other suitable entity that can generate content of interest for network users. For example, Twitter can be an event generation element, where the trending topics in Twitter can be systematically evaluated, gleaned, or otherwise monitored in order to predict how resources should be allocated in the network. As a refinement to the activities of system 10, the strength of a given event can be assessed in order to make predictive decisions about resources. Further, the strength of the event could involve the number of hits being seen by the search engine, the frequency of keywords, the closeness of the words being identified by the search engine (e.g., the headlines being identified), etc. Hence, a scaling factor can be employed by the present disclosure in order to assess an appropriate response. The scaling factor can be used to judge an appropriate response, where resources can be dynamically allocated up-and-down to meet the increase in network traffic. The scaling factor is effectively being used to assess how much the system should react to the predicted load.

Search engine element 30 represents a network entity configured to receive search requests from particular end users. Further, search engine element 30 is capable of analyzing network traffic flowing through its infrastructure in accordance with one embodiment of the present disclosure. Note that as used herein in this Specification, the term 'network traffic' is meant to include Internet traffic, IP traffic generally, hypertext transfer protocol (HTTP) traffic, Simple Network Management Protocol (SNMP) traffic, requests generally, e-mail traffic, search queries, packets, or any other data segment, cell, or datagram associated with a network transmission.

Figure 3:
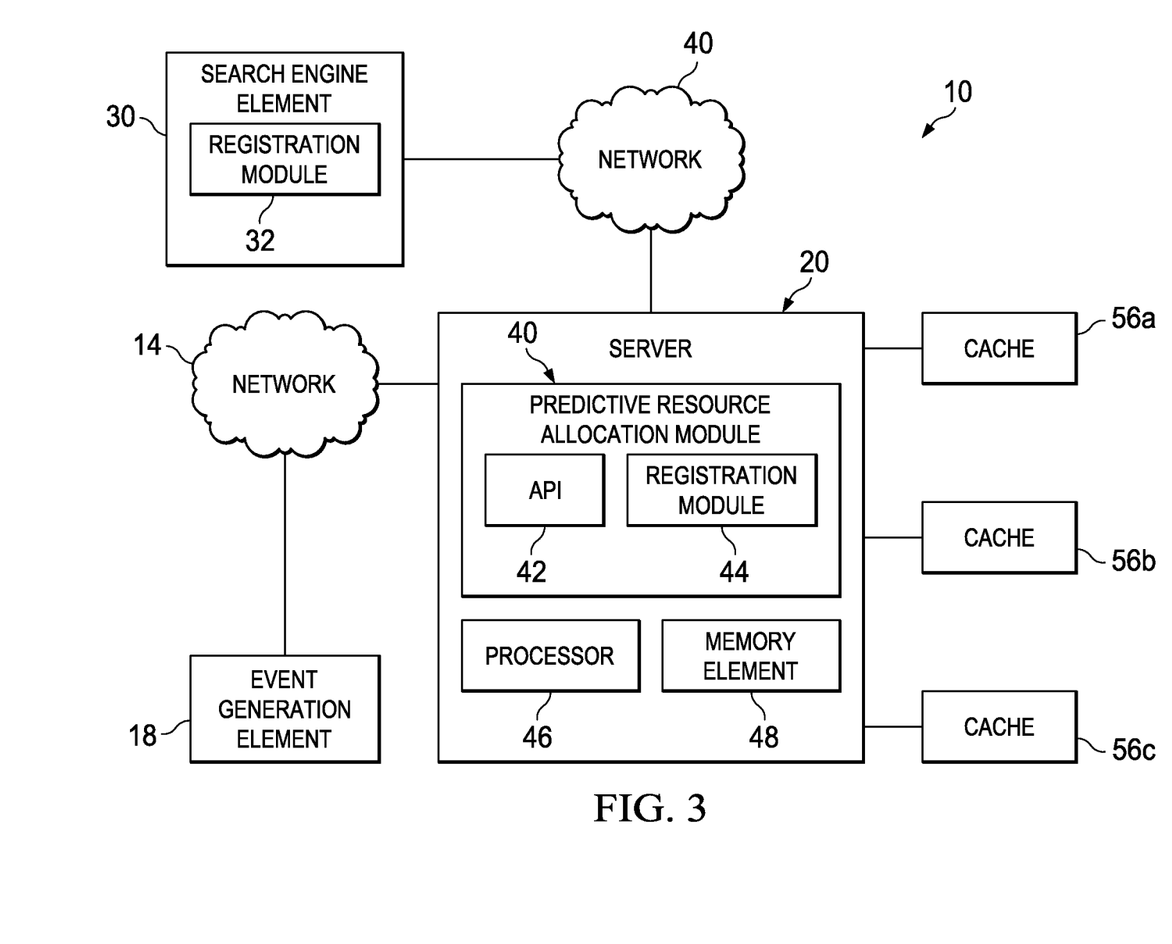
FIG. 3 is a simplified block diagram illustrating another example configuration associated with the system.

Search engine element 30 may be, more generally, any network element that receives end user flows associated with a given end user device (e.g., over networks such as those illustrated in FIGS. 1-3). Search engine element 30 can represent search providers such as Google.com, Yahoo.com, etc., as well as business entities that may be queried for information (e.g., www.movieshowtimes.com, www.apple.com, etc.). In one particular example, search engine element 30 may include web servers relegated for traffic destined for various hostnames (e.g., having various uniform resource locators (URLs) including Google.com, Yahoo.com, etc.).

Registration modules 32 and 44 are mechanisms that can cooperate, or that interact with each other in order to identify particular content of interest for server 20. For example, a network administrator can subscribe to search engine element 30 via the registration modules. This could include subscribing to particular types of events (e.g., publications, video broadcasts, e-mails, Tweets, blog posts, Facebook entries, particular keywords, particular subject areas, particular content, particular subsets of traffic, particular events associated with individual people or companies or entities, etc.). In essence, server 20 is registering with search engine element 30 to be apprised of events involving particular areas of interest. Search engine element 30 includes a publish/subscribe aspect to its activities, where it can readily flag certain events as being segments of interest for particular entities.

API 42 can be associated with various protocols for interfacing with other network elements in order to receive information. For example, API 42 can interact with SNMP elements, e-mail elements, data feeds, etc. In one particular instance, there can be a separate API for each type of protocol for which server 20 is receiving data, or an API can be provided for each search engine to which server 20 is subscribed. Additionally, the APIs provisioned within server 20 could include appropriate intelligence for suitably communicating with proprietary devices.

In operation of an example scenario involving registration activities, consider the case where a public announcement is about to be made by a senior vice president, who will be disclosing a new technology at a tradeshow. In such an example, event generation element 18 may be reflective of a video server configured to broadcast this information being delivered by the speaker. Additionally, in this particular example, server 20 is associated with content that is most likely going to be accessed as a result of such an announcement. Based on an existing relationship for which server 20 is registered, server 20 could be alerted of this event by an appropriate entity (e.g., search engine element 30 could be receiving certain keywords associated with the announcement). More specifically, search engine element 30 understands that there are certain keywords to which server 20 has expressed interest in monitoring. Hence, in this scenario, as those keywords become more prominent in end user searches, search engine element 30 can match those keywords to server 20, and deliver the alert ahead of a surge in network traffic. Hence, because server 20 is registered with search engine element 30, server 20 is effectively being notified/alerted of a potential surge in user activity.

Server 20 can react to this notification/alert by proactively deploying additional resources in anticipation of the end user demand. In essence, due to the announcement, a number of hits are about to flood server 20. However, server 20 down has sufficient time in order to prepare appropriate resources to meet this surge in activity. Note also that speaking (in particular) could be associated with a subsequent transmission that can be quickly evaluated for important keywords, which would trigger an increase in network traffic. Hence, there could be an intermediate activity associated with identifying the important terms disclosed in real-time video feeds, where subsequent predictions can be made based on inspecting the video broadcast. In one particular instance, a transcription function can be added to the activities of system 10 such that the keyword searching could be based on the transcription data. In at least one general sense, this could represent a modest delay in understanding (and in predicting) the surge in network traffic.

FIG. 3 is a simplified block diagram illustrating another example implementation associated with the teachings of the present disclosure. In this particular arrangement, FIG. 3 includes multiple caching mechanisms 56a-c that are provisioned to accommodate the scenario in which the same request would be issued repeatedly by end users (e.g., the same query for content, the same query for a particular object, the same request for video data, etc.). In operation, server 20 can access memory element 48 (i.e., content at the disk level) and copy that information to each of caches 56a-c. As incoming requests are received by server 20, the request can be distributed across caches 56a-c to accommodate the increased load. In one sense, each of caches 56a-c are being preloaded with information stored in memory element 48, where access to any caching mechanism would be significantly faster than accessing information from disk configurations within memory element 48. After a configurable time, the deployed resources (i.e., the caches) can be ramped down once the load has attenuated.

Figure 4A:
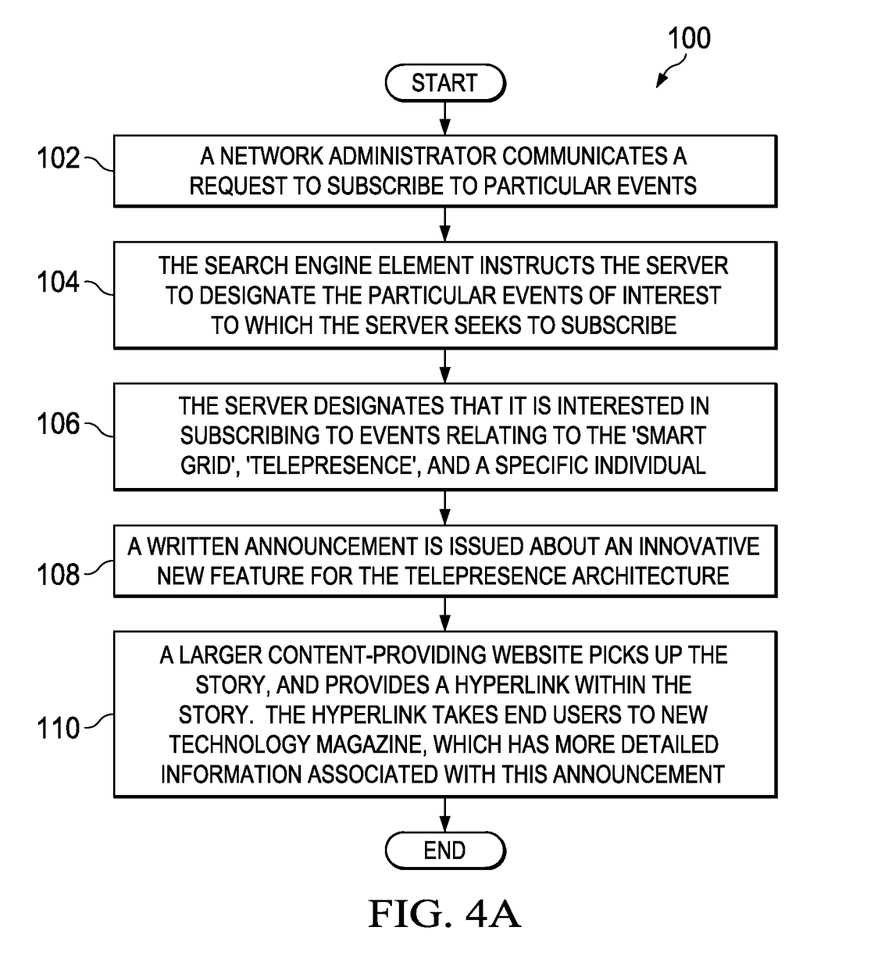
FIGS. 4A-B are simplified flowcharts illustrating example operations associated with the system.
Figure 4B:
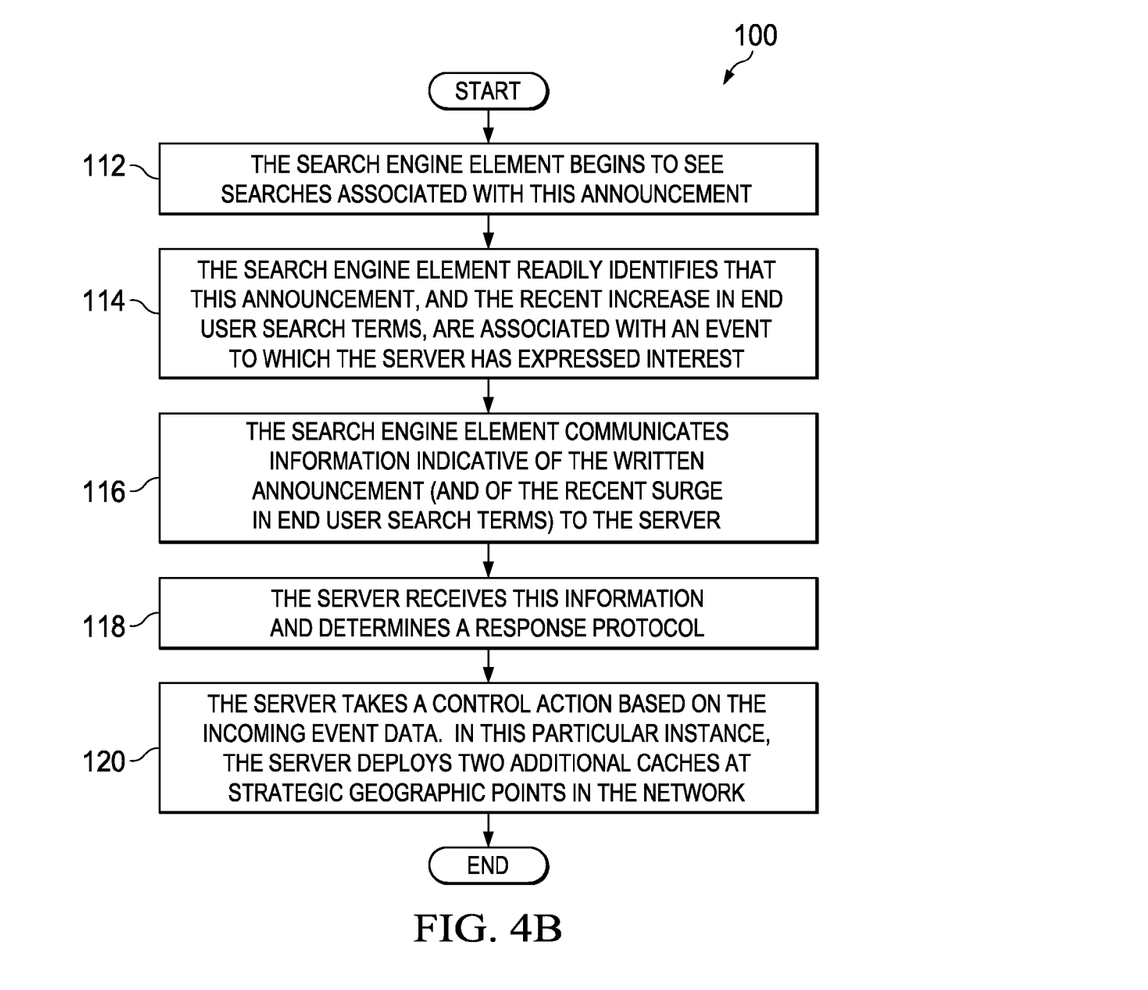

FIGS. 4A-B are simplified flowcharts 100 illustrating one possible example associated with registration activities of the present disclosure. The registration activity may begin at 102, where a network administrator communicates a request to subscribe to particular events, where information associated with those events that may be systematically gleaned by search engine element 30. In response to this initial request, at 104 search engine element 30 instructs server 20 to designate the particular events of interest to which server 20 seeks to subscribe. In this particular example, server 20 is a web server configured to provide content associated with 'New Technology' Magazine. New Technology Magazine has a viewership that is only interested in particular types of technology. Further, in this particular example, when specific types of announcements are made, the website associated with New Technology Magazine quickly becomes overwhelmed (and has even crashed under previous congestion scenarios).

At 106, server 20 designates that it is interested in subscribing to events relating to the 'Smart Grid', 'TelePresence', and a specific individual (e.g., Senior Vice President John Smith, who is associated with both of these technologies). Server 20 also designates the type of information to which it is interested. In this particular example, the types of information of interest to server 20 relate to academic publications, news headlines, video feeds, and technology blogs having a particular authorship.

At 108, a written announcement is issued about an innovative new feature for the TelePresence architecture. At 110, a larger content-providing website (e.g., MSN) picks up the story, and provides a hyperlink within the story. The hyperlink takes end users to New Technology Magazine, which has more detailed information associated with this announcement. Furthermore, in this particular example, New Technology Magazine has limited hardware resources for accommodating end user requests. Search engine element 30 begins to see searches associated with this announcement, as is depicted in 112. At 114, search engine element 30 readily identifies that this announcement, and the recent increase in end user search terms, are associated with an event to which server 20 has expressed interest. At 116, search engine element 30 communicates information indicative of the written announcement (and of the recent surge in end user search terms) to server 20. At 118, server 20 receives this information and, further, reviews various internal policies that outline how to respond to certain types of events, certain types end user searches being generated, etc.

In order to meet the surge in traffic, server 20 takes a control action based on the incoming event data. In this particular instance at 120, server 20 deploys two additional caches at strategic geographic points in order to accommodate the predicted load generated by this announcement. In this sense, the architecture has intelligently and proactively allocated resources to accommodate the predicted load.

As a further refinement to the operations of system 10, the particular policy response could factor in the geographic position of the predicted incoming requests. For example, because this technology was associated with Telepresence, the subscriber base that would be creating new requests for this information could be in the Silicon Valley. Accordingly, at least one of the caches for New Technology Magazine could be brought online in the Silicon Valley. Hence, proximity factors could be integrated into the policy reactions that are attempting to address the predicted load, which is caused by a network event.

As another refinement to system 10, part of the resource allocation can involve advertising activities. For example, if a given web server understood that incoming traffic was about to be delivered to a particular website, targeted advertising could be delivered to that anticipated group of end users. Hence, server 20 could be configured to offer ancillary advertising based on the predicted demand, or this information can simply be relayed to any suitable third party, which may have particular expertise or specific advertising resources to be deployed. In some instances, there could be a relationship between server 20 and designated third parties, which can provide this advertising, or provide complementary content in response to the predicted surge in network traffic.

Figure 5:
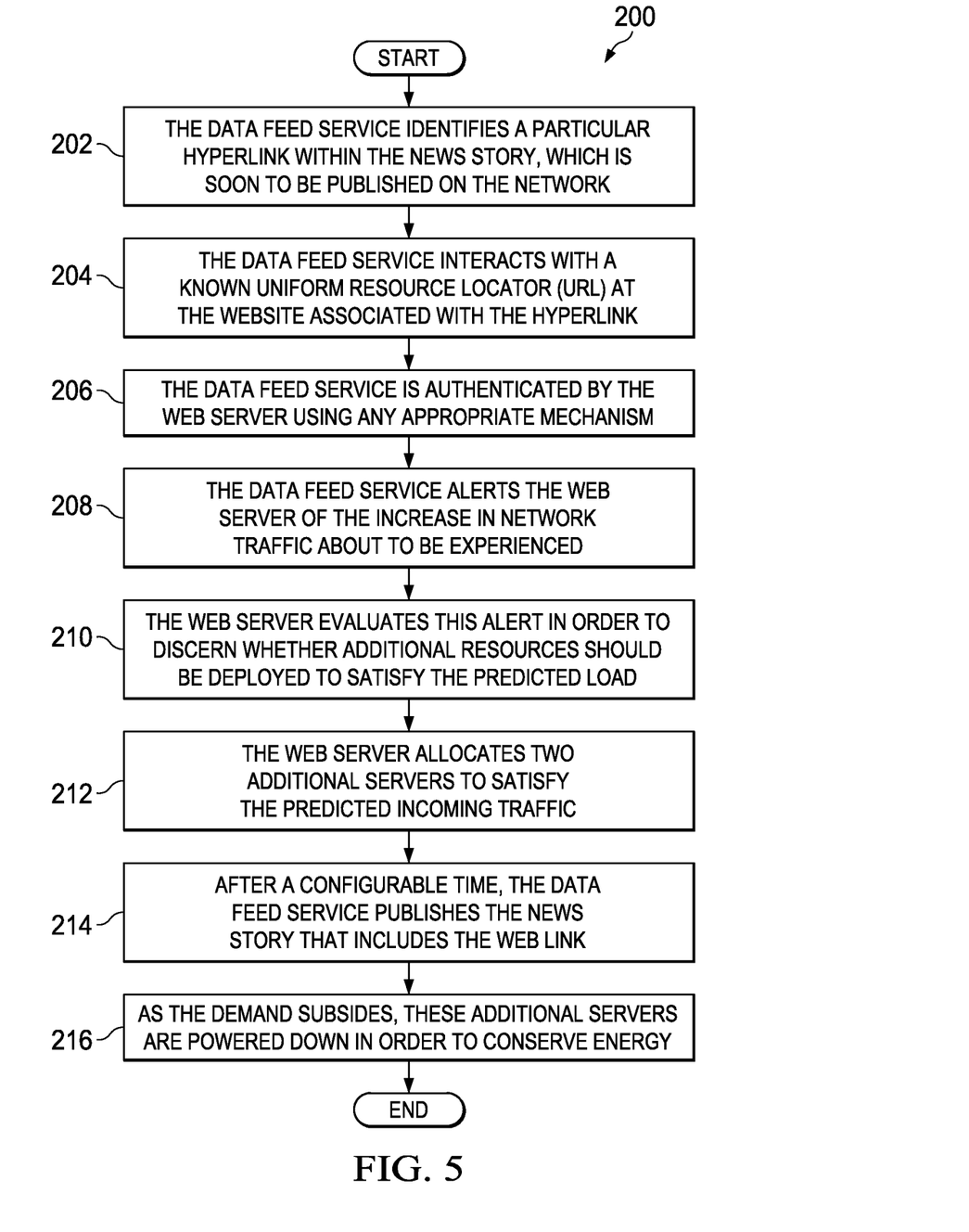
FIG. 5 is another simplified flowchart illustrating alternative operations associated with the system.

FIG. 5 is another simplified flowchart 200 illustrating one possible scenario to be accommodated by the teachings of the present disclosure. In this particular instance, a data feed service is slated to publish a news story that includes a web link corresponding to a particular web server, which has modest capacity. Additionally, the data feed service is attempting to proactively warn the web server of the significant load about to be encountered.

At 202, the data feed service identifies a particular hyperlink within the news story, which is soon to be published on the network. At 204, the data feed service interacts with a known uniform resource locator (URL) at the website associated with the hyperlink. At 206, the data feed service is authenticated by the web server using any appropriate mechanism (e.g., cryptography, reputation data, a security key, a third-party brokering service, etc.). After a suitable authentication, the data feed service would alert the web server of the increase in network traffic about to be experienced. This is illustrated at 208. It should be emphasized that the type of alert to be communicated to an interested network entity (e.g., server 20) can take any appropriate format, be provided in any appropriate protocol, and include any information applicable to allocating, de-allocating, optimizing, or otherwise provisioning resources.

Note that this notification protocol could be part of the registration process, where registered web servers could be provided with 30-second notices of the potential for significant increases in traffic. In certain cases, the data feed service could be associated with any type of content provider (e.g., Yahoo, Google, etc.) that commonly see search terms, which may be trending. Other sources of inputs can include Twitter trending topics, ping servers, or any other suitable data source that can be received.

When the search terms trend to a certain threshold, the alert (i.e., the event data) can be sent out to those web servers that have subscribed to this particular provisioning service. In other scenarios, a new product launch could be the event that triggers the notifications being sent to subscribing web servers. Those subscribing entities can quickly (i.e., in real-time) proactively allocate resources to meet this increase in network traffic demand.

Returning to the flow of FIG. 5, at 210, the web server evaluates this alert in order to discern whether additional resources should be deployed to satisfy the predicted load. At 212, the web server allocates (i.e., brings online) two additional servers to satisfy the predicted incoming traffic. At 214, and after a configurable time, the data feed service publishes the news story that includes the web link. As users click on the web link, and thereby navigate to the web server, the proactively allocated resources successfully satisfy this incoming demand. As the demand subsides, these additional servers can be powered down in order to conserve energy. This is depicted at 216.

Note that for the Bayesian filtering, there can be a corpus of events that are processed by the architecture. Additionally, the output can be the traffic seen as a result of the particular event. Once these input and output data segments have been identified, correlations can be made between the two items. Furthermore, this information can be used as part of the predictive modeling associated with allocating additional resources. Note that this information can continue to grow over time and, accordingly, be modified and adapted on an ongoing basis. Similarly, items associated with trust metrics can continue to be aggregated over time. A higher level of trust would merit a stronger response based on the information being provided by that particular source of information.

Note that in certain example implementations, the resource allocation functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 2-3] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIGS. 2-3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, server 20 includes software in order to achieve the resource allocation functions outlined herein. These activities can be facilitated by predictive resource allocation module 40, processor 46, etc. Server 20 can include memory elements for storing information to be used in achieving the intelligent resource allocation operations, as outlined herein. Additionally, any other of the devices illustrated in the preceding FIGURES may include a processor that can execute software or an algorithm to perform the resource allocation activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each network element of FIGS. 1-3 (e.g., server 20, search engine element 30) can also include suitable interfaces for receiving, transmitting, and/or otherwise communicating data or information in a network environment.

Note that with the example flows provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular web server configurations, system 10 may be applicable to other arrangements in which different types of network resources can be deployed in response to a predicted surge in network traffic. For example, bandwidth links can be provisioned in response to a predicted load. Similarly, if the predicted load were associated with an event that spawned traffic needing enhanced security processing, then firewalls could be deployed as additional resources to satisfy this demand. Note also that in deploying any such resource, part of the deployment can simply be throttling the existing resources that are already online. For example, certain pieces of network equipment may be running at partial capacity, or at some type of low power state. If the predicted load suggested that current resource levels would not be adequate to satisfy the increase in network traffic, then these existing resources can simply be throttled higher.

Moreover, although system 10 has been illustrated with reference to particular elements and operations that facilitate the communication process, these elements and operations may be replaced by any suitable architecture or process that achieves the intended functionality of system 10. Any system or architecture that processes and/or that receives network traffic would be amenable to the resource allocation features discussed herein. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
monitoring content of network traffic;
receiving information predictive of a network event from the content of the network traffic, wherein the information predictive of the network event is identified through a search engine configured to monitor a user search request and determine a subject of the user search request and/or respective user search request result;
predicting future network activity associated with the network event based on the subject of the user search request and/or respective user search request result;
determining a level of network resources that can accommodate the network activity associated with the network event;
evaluating currently deployed network resources; and
allocating new network resources based on the network activity that was predicted, wherein the new network resources are allocated before the network activity occurs.

2. The method of claim 1, wherein the new network resources include a cache configured to receive replicated content from a server.

3. The method of claim 1, wherein the new network resources include a virtual machine configured to interact with a server to distribute a load associated with the network event.

4. The method of claim 1, wherein the information predictive of the network event is received based on a registration activity executed by a server configured to designate particular events for which it is interested.

5. The method of claim 1, wherein an application program interface (API) is used to interface with a source associated with the network event, and wherein the API is associated with a certain type of protocol.

6. Logic encoded in one or more tangible, non-transitory media that includes code for execution and when executed by a processor operable to perform operations comprising:
monitoring content of network traffic;
receiving information predictive of a network event from the content of the network traffic, wherein the information predictive of the network event is identified through a search engine configured to monitor a user search request and determine a subject of the user search request and/or respective user search request result;
predicting future network activity associated with the network event based on the subject of the user search request and/or respective user search request result;
determining a level of network resources that can accommodate the network activity associated with the network event;
evaluating currently deployed network resources; and
allocating new network resources based on the network activity that was predicted, wherein the new network resources are allocated before the network activity occurs.

7. The logic of claim 6, wherein the new network resources include a cache configured to receive replicated content from a server.

8. The logic of claim 6, wherein the new network resources include a virtual machine configured to interact with a server to distribute a load associated with the network event.

9. The logic of claim 6, wherein the information predictive of the network event is received based on a registration activity executed by a server configured to designate particular events for which it is interested.

10. An apparatus, comprising:
a memory element configured to store data;
a resource module; and
a processor operable to execute instructions associated with the data, wherein the processor, the resource module, and the memory element cooperate in order to:
monitor content of network traffic;
receive information predictive of a network event from the content of the network traffic, wherein the information predictive of the network event is identified through a search engine configured to monitor a user search request and determine a subject of the user search request and/or respective user search request result;
predict future network activity associated with the network event based on the subject of the user search request and/or respective user search request result;
determine a level of network resources that can accommodate the network activity associated with the network event;
evaluate currently deployed network resources; and
allocate new network resources based on the network activity that was predicted, wherein the new network resources are allocated before the network activity occurs.

11. The apparatus of claim 10, wherein the new network resources include a cache configured to receive replicated content from a server.

12. The apparatus of claim 10, wherein the new network resources include a virtual machine configured to interact with a server to distribute a load associated with the network event.

13. The apparatus of claim 10, wherein the information predictive of the network event is received based on a registration activity executed by a server configured to designate particular events for which it is interested.

14. The apparatus of claim 10, wherein an application program interface (API) is used to interface with a source associated with the network event, and wherein the API is associated with a certain type of protocol.

15. The method of claim 1, wherein receiving information predictive of the network event comprises receiving information published in response to a subscription indicating network events of interest.

16. The logic of claim 6, wherein receiving information predictive of the network event comprises receiving information published in response to a subscription indicating network events of interest.

17. The apparatus of claim 10, wherein information predictive of the network event comprises information published in response to a subscription indicating network events of interest.

18. The method of claim 1, wherein predicting future network activity associated with the network event comprises utilizing a Bayesian filter.

19. The logic of claim 6, wherein the code that, when executed by the processor, causes the processor to predict future network activity associated with the network event through use of a Bayesian filter.

20. The apparatus of claim 10, wherein the processor is configured to predict future network activity associated with the network event through use of a Bayesian filter.

* * * * *